United States Patent
Attenberger

(10) Patent No.: US 10,207,670 B2
(45) Date of Patent: Feb. 19, 2019

(54) SIDE AIRBAG FOR VEHICLES AND METHOD FOR FOLDING A SIDE AIRBAG

(71) Applicant: Audi AG, Ingolstadt (DE)

(72) Inventor: Michael Attenberger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 152 days.

(21) Appl. No.: 15/120,355

(22) PCT Filed: Dec. 16, 2014

(86) PCT No.: PCT/EP2014/003364
§ 371 (c)(1),
(2) Date: Aug. 19, 2016

(87) PCT Pub. No.: WO2015/124164
PCT Pub. Date: Aug. 27, 2015

(65) Prior Publication Data
US 2017/0225642 A1    Aug. 10, 2017

(30) Foreign Application Priority Data

Feb. 21, 2014   (DE) .................. 10 2014 002 536

(51) Int. Cl.
*B60R 21/237* (2006.01)
*B60R 21/264* (2006.01)
(Continued)

(52) U.S. Cl.
CPC .......... *B60R 21/237* (2013.01); *B60R 21/235* (2013.01); *B60R 21/23138* (2013.01);
(Continued)

(58) Field of Classification Search
CPC ........ B60R 21/237; B60R 2021/23576; B60R 2021/23538; B60R 21/235;
(Continued)

(56) References Cited

U.S. PATENT DOCUMENTS 5,899,490 A * 5/1999 Wipasuramonton ........................ B60R 21/237 280/730.2
6,371,518 B1 * 4/2002 Kalandek .............. B60R 21/201 280/730.1

(Continued)

FOREIGN PATENT DOCUMENTS

CN          1226860       8/1999
CN        101108606       1/2008

(Continued)

OTHER PUBLICATIONS

Machine Translation for Fujiwara, WO 2013-031009 A1, Mar. 2013.*

(Continued)

*Primary Examiner* — Christopher J Besler
*Assistant Examiner* — Christine Pellazar Bersabal
(74) *Attorney, Agent, or Firm* — Henry M. Feiereisen LLC

(57) ABSTRACT

In a method for folding a side airbag a first material layer and a second material layer are connected along a first edge portion by a first seam and connected along second edge portions by a second seam perpendicular to the first seam to bound a chamber. The two material layers are placed flat upon one another and a region of the second seam is slipped in a first direction inwards while forming a tip. A tip-distal end of the first and second material layers is folded several times in the first direction and the tip is folded, with the folded-over portion being slipped in the first direction inwardly. A gas generator is inserted in the first direction into the two material layers; and roll folding is carried out from an end in opposition to the gas generator in a second direction in transverse relation to the first direction.

1 Claim, 8 Drawing Sheets

(51) Int. Cl.
  *B60R 21/235* (2006.01)
  *B60R 21/231* (2011.01)
(52) U.S. Cl.
  CPC .. *B60R 21/264* (2013.01); *B60R 2021/23146* (2013.01); *B60R 2021/23538* (2013.01); *B60R 2021/23576* (2013.01)
(58) Field of Classification Search
  CPC ............ B60R 21/23138; B60R 21/264; B60R 2021/23146
  See application file for complete search history.

(56) References Cited

U.S. PATENT DOCUMENTS

| | | | |
|---|---|---|---|
| 2007/0007755 A1* | 1/2007 | Bauer | B60R 21/233 280/729 |
| 2007/0085316 A1* | 4/2007 | Ruterbusch | B60R 21/237 280/743.1 |
| 2012/0013107 A1 | 1/2012 | Shankar | |
| 2015/0353045 A1 | 12/2015 | Sendelbach | |

FOREIGN PATENT DOCUMENTS

| | | | | |
|---|---|---|---|---|
| CN | 101973241 | | 2/2011 | |
| DE | 10 2011 079 852 A1 | | 1/2013 | |
| DE | 10 2012 224 178 A1 | | 3/2013 | |
| JP | WO 2013031009 A1 | * | 3/2013 | ....... B60R 21/23138 |
| WO | WO 2013/153933 A1 | | 10/2013 | |

OTHER PUBLICATIONS

International Search Report issued by the European Patent Office in International Application PCT/EP22014/003364.
Chinese Search Report dated Apr. 14, 2017 with respect to counterpart Chinese patent application 201480069951.2.
Translation of Chinese Search Report dated Apr. 14, 2017 with respect to counterpart Chinese patent application 201480069951.2.

* cited by examiner

SIDE AIRBAG FOR VEHICLES AND METHOD FOR FOLDING A SIDE AIRBAG

CROSS-REFERENCES TO RELATED APPLICATIONS

This application is the U.S. National Stage of International Application No. PCT/EP2014/003364, filed Dec. 16, 2014, which designated the United States and has been published as International Publication No. WO 2015/124164 and which claims the priority of German Patent Application, Serial No. 10 2014 002 536.5, filed Feb. 21, 2014, pursuant to 35 U.S.C. 119(a)-(d).

BACKGROUND OF THE INVENTION

The invention relates to a side airbag for vehicles and to a method for the folding of a side airbag.

Side airbags are provided in vehicles for protection of the vehicle occupants in the event of a side impact or a rollover and have a gas bag which is filled by gas generated pyrotechnically by a gas generator. Such a side airbag normally deploys from a side region of a vehicle seat rest or from a side panel of the vehicle, so that the inflated gas bag extends in the area between the vehicle occupant, for example the driver, and the sidewall of the vehicle, so that as a result the area of the shoulder and the waist, optionally also the driver's head, are protected.

Such a side airbag is e.g. known from the generic DE 10 2012 224 178 A1 and has a gas bag which is mounted in a backrest of a vehicle seat in the folded state. This gas bag includes first and second material layers which when flatly spread out are placed upon one another, with their edges being sewn together, so as to form in the inflated state a cushion shape, with the material layers extending in vehicle longitudinal direction. Such gas bags can be produced inexpensively because of their simple structure that allows sewing by machine. However, such two-dimensional gas bags encounter the problem that the thickness in the region of their outer circumferential edges, where the two material layers are sewn, is less than in their central region. Therefore, such gas bags must be sized larger in order to realize a sufficient thickness in certain regions for protection of the vehicle occupants. This, however, incurs increased material costs.

Object of the invention is therefore to provide a side airbag with a gas bag of the aforementioned type, in which in certain border regions an adequate gas bag thickness can be ensured in a simple manner. It is another object of the invention to provide a simple method for folding the side airbag according to the invention.

SUMMARY OF THE INVENTION

According to one aspect of the invention, a side airbag for vehicles, including at least a first and a second material layer for formation of at least one gas bag having a chamber which is inflatable with gas, with the first material layer extending in vehicle longitudinal direction in the inflated state of the gas bag, and with the second material layer opposing the first material layer, and with the first and second material layers being connected with one another along at least a respective first edge portion, is characterized in accordance with the invention in that in the inflated state of the gas bag, the first and second material layers, on one hand, are each formed with a first edge portion extending in vehicle vertical direction and, on the other hand, are each formed with a second edge portion which extends in a plane spanned by the vehicle longitudinal direction and the vehicle transverse direction, the first edge portions of the first and second material layers are connected by a first seam that partly bounds the chamber, and a second seam is provided which is formed by the second edge portions and bounds the chamber in addition to the first seam and which extends transversely to the first seam.

In simple and surprising manner, the adequate gas bag thickness is achieved in certain regions by connecting the second edge portions not according to the course of the first seam, but by a second seam which extends perpendicularly or transversely thereto, so that the adequate gas bag thickness forms precisely in direction of this second seam.

With the first seam, the gas bag receives in the inflated state a tubular shape in vehicle vertical direction, with at least one of the tube ends of this tubular shape being closed by the transverse second seam.

Such a gas bag according to the invention can be manufactured inexpensively by machine in a simple manner.

According to an advantageous configuration of the invention, each of the second edge portions is folded onto itself to form the second seam. As a result, the second edge portions of the two material layers are not sewn to one another, but the second seam, which extends transversely to the first seam, is formed by folding each of the second portions onto itself and by sewing it with itself.

According to a further advantageous configuration of the invention, the first and second material layers are formed such that the at least one chamber is bounded in the inflated state of the gas bag by the second seam downwards in vehicle vertical direction. As a result, the tubular chamber formed by the first seam and extending in vehicle vertical direction is closed downwards by the second seam. Thus, an adequate gas bag thickness is realized at the lower end of the gas bag and adequate protection of the waist area of a vehicle occupant is ensured, since the adequate gas bag thickness in the region of the second seam attains a force coupling with the sidewall of the vehicle or a support upon this sidewall.

According to a further advantageous configuration of the invention, the first and second material layers are formed such that the first seam extends in the inflated state of the gas bag as further first seam toward the further edge portions of the first and second material layers, which further edge portions bound the chamber upwards in vehicle vertical direction. Thus, also the upper tube end of the tubular chamber, formed by the first seam, is closed in typical manner by such a first seam.

It is particularly advantageous in accordance with a further configuration of the invention, when the first and second material layers are formed from a single-piece gas bag material layer, which is folded over along at least one fold line, so that the two material layers face each other. Preferably, the gas bag material layer is formed in the inflated state of the gas bag with a fold line which extends in vehicle vertical direction and connects in vehicle vertical direction the second edge portions of both material layers downwardly. This results in a mirror-symmetric configuration of the gas bag material layer, which is also referred to as so-called butterfly cut. In the non-inflated state of the gas bag, the two mirror-symmetrically cut material layers can be placed upon one another and sewn via the first and second seams.

Particularly advantageous in accordance with a further configuration of the invention is the provision of fastening means in the region of the fold line of the gas bag material layer for connection of the gas bag with a gas generator.

The side air bag according to the invention is arranged with its gas bag in the region of a backrest of a vehicle seat.

According to another aspect of the invention, a method for folding a side airbag is characterized by the following steps:
- in a method step, the two material layers are placed flat upon one another, with the region of the second seam being slipped in a first direction into the interior of the gas bag while forming a tip,
- in a further method step, the end of both material layers in opposition to the tip is folded several times in the first direction,
- in a further method step, the tip is folded over and the folded-over portion is slipped in the first direction into the interior of the gas bag,
- in a further method step, a gas generator is inserted in the first direction into the two material layers, and
- in a further method step, starting with the end in opposition to the gas generator, a roll folding is carried out in a second direction that extends transversely to the first direction.

BRIEF DESCRIPTION OF THE DRAWING

The invention is described hereinafter in greater detail with respect to an exemplary embodiment of a side airbag according to the invention and a method of folding the gas bag according to the invention with reference to the attached figures.

It is shown in.

DETAILED DESCRIPTION OF PREFERRED EMBODIMENTS

Figure 1:
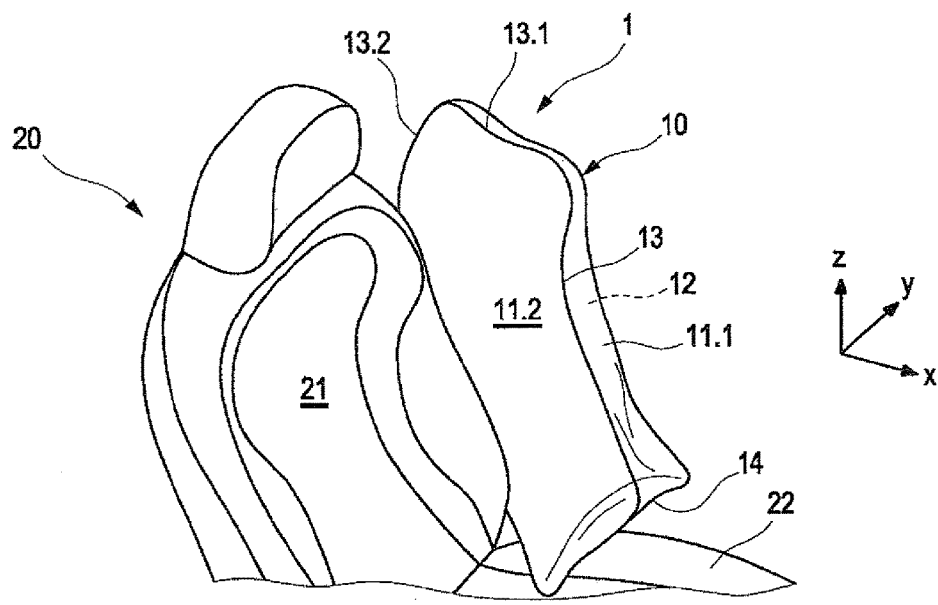
FIG. 1 a perspective illustration of a side airbag tethered to a vehicle seat and having an inflated gas bag according to the invention, FIG. 2 another perspective illustration of the side airbag of FIG. 1, FIG. 3 a planar projection of the gas bag according to the FIGS. 1 and 2, FIG. 4 a schematic illustration of the side airbag of FIG. 1 in the non-inflated state of the gas bag with a view onto the back of the vehicle seat, FIG. 5 a perspective illustration of the gas bag of the side airbag of FIG. 1 in the non-inflated state and placed upon a base, FIG. 6 another perspective illustration of the gas bag of the side airbags of FIG. 1 in the non-inflated state, FIG. 7 an illustration of the gas bag of the side airbag of FIG. 1 with flatly placed material layers, FIG. 8 an illustration of the gas bag of the side airbag of FIG. 7 in the state of a first folding step, FIG. 9 an illustration of the gas bag of FIG. 8 in the state of a further folding step, FIG. 10 an illustration of the gas bag of FIG. 9 in the state of a further folding step, FIG. 11 an illustration of the gas bag of FIG. 10 in the state of a further folding step, FIG. 12 an illustration of the gas bag of FIG. 11 by way of another perspective, FIG. 13 an illustration of the gas bag of FIG. 11 with a gas generator, FIG. 14 an illustration of the gas bag of FIG. 13 in the state of a further folding step, FIG. 15 an illustration of a gas bag fully folded in the form of a gas bag package.
Figure 2:
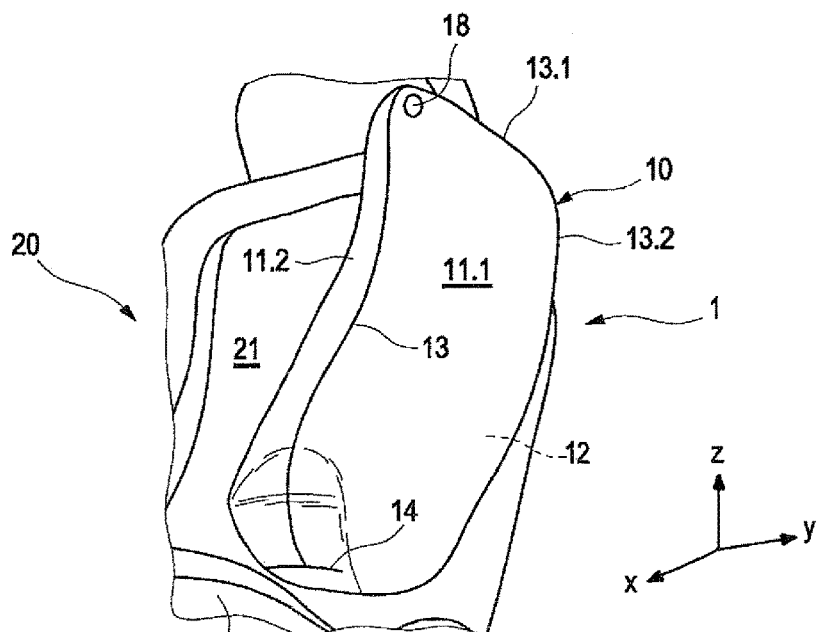

FIGS. 1 and 2 show a vehicle seat 20 of a vehicle (not shown) with a backrest 21 and a seat cushion 22, with a side airbag 1 being arranged in the backrest 21 and including a gas bag 10 and a gas generator. This gas bag 10 is shown in FIGS. 1 and 2 in an inflated state and extends, starting from an outer side region of the backrest 21 in vehicle longitudinal direction (x-direction) between a sidewall of the passenger compartment of the vehicle and a vehicle occupant seated on the vehicle seat 20, so that shoulder and hip regions are covered.

Figure 3:
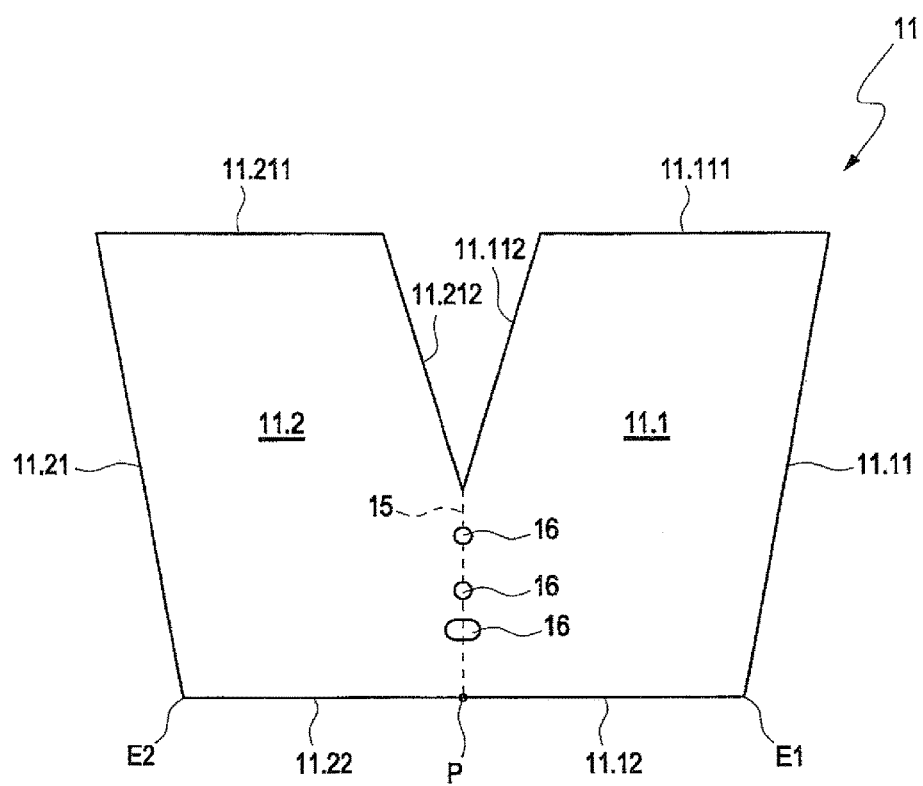

This gas bag 10 includes first and second material layers 11.1 and 11.2, which are produced according to FIG. 3 in the form of a single-piece gas bag material layer 11. As is apparent from FIGS. 1 and 2, the first material layer 11.1 extends on the side facing away from the vehicle seat 20 in vehicle longitudinal direction (x-direction), while the second material layer 11.2 in opposition to the first material layer 11.1 extends on the side of the vehicle seat. Further provided according to FIG. 2 is an outflow opening 18 in the first material layer 11.1 of the gas bag 10.

The single-piece gas bag material layer 11 according to FIG. 3 includes in its planar projection the first and second material layers 11.1 and 11.2 arranged mirror-symmetrically with respect to a fold line 15. The two material layers 11.1 and 11.2 are connected in the region of this fold line 15; moreover, fastening means 16 in the form of openings are provided in this region for securing a gas generator. When being folded along the fold line 15 upon one another, these two material layers 11.1 and 11.2 lie upon one another congruently, so that their edges can be connected with a seam for formation of a chamber 12 of the gas bag 10, which chamber is filled by gas using the gas generator.

Each of the two material layers 11.1 and 11.2 has a first edge portion 11.11 and 11.21, which, when sewn together, form a first seam 13 which extends in accordance with FIGS. 1 and 2 substantially in vehicle vertical direction (z-direction) on the front side of the gas bag 10 in relation to the vehicle. This first seam 13 would bound gas-filled chamber 12 of the gas bag 10 in such a way as to establish an open-ended tubular shape. An open end of the tubular shape ends with further first edge portions 11.111 and 11.112 of the first material layer and 11.1 and with further first edge portions 11.211 and 11.212 of the second material layer 11.2. The further first edge portions 11.111 and 11.211 and the further first edge portions 11.112 and 11.212 are placed upon one another and connected corresponding to the first edge portions 11.11 and 11.21 for formation of further first seams 13.1 and 13.2. In this state, these further first edge portions 11.111 and 11.112 as well as 11.211 and 11.212 form the upper region of the gas bag 10 in vehicle vertical direction. The further first seam 13.1 extends hereby substantially in the plane spanned by the vehicle longitudinal direction and the vehicle transverse direction, whereas the further first seam 13.2 extends substantially in vehicle vertical direction at the backside of the gas bag 10 in relation to the vehicle.

After the first seam 13 and the further first seams 13.1 and 13.2 have been made, the gas bag 10, still open in the region of the second edge portions 11.12 and 11.22, is everted so that the seam hems of these seams 13, 13.1 and 13.2 are situated inside the gas bag 10, as shown in FIGS. 1 and 2.

The remaining second edge portions 11.12 and 11.22 are each folded onto themselves after the gas bag 10 has been everted, so that according to FIG. 3, the corners E1 and E2 of the first material layer 11.1 and the second material layer 11.2, as connected by the first seam 13, lie on the point P lying on the fold line 15 so as to subsequently sew the second edge portions for formation of a second seam 14. The seam hem of this second seam 14 thus remains on the outside and is visible (cf. FIGS. 5 and 6). In the inflated state of the gas bag 10, the thus established second seam 14 extends transversely to the first seam 13 and to the further first seams 13.1 and 13.2, as can be seen from the FIGS. 1 and 2.

Figure 4:
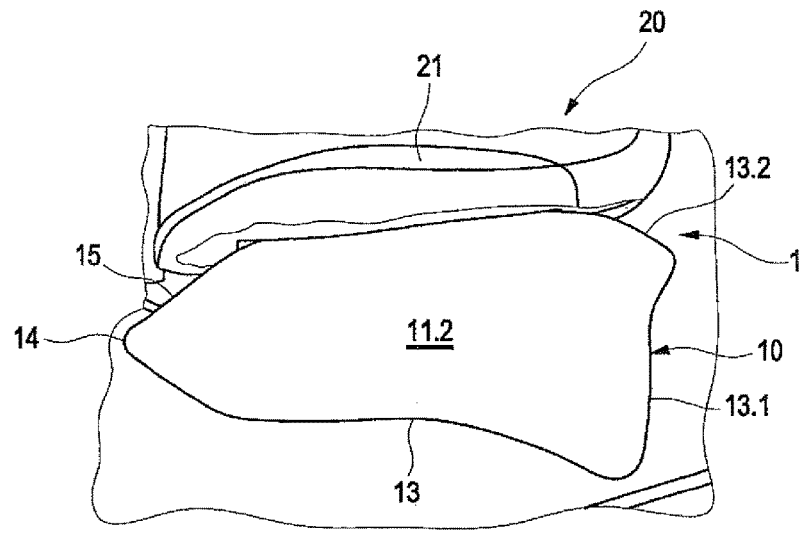
Figure 5:
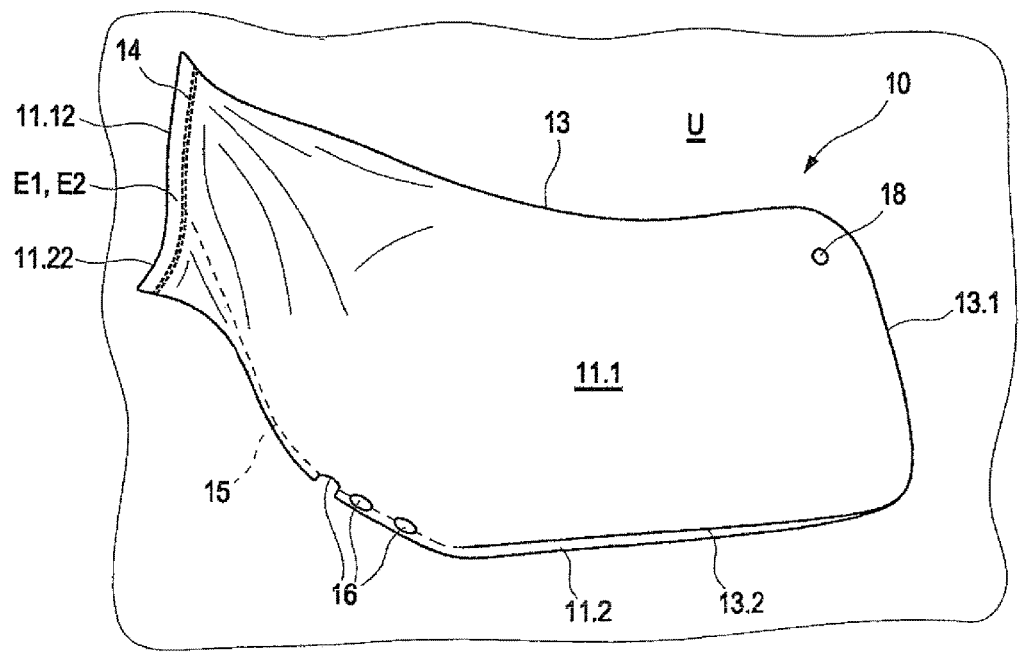

The non-inflated gas bag 10 produced in this way is shown in FIGS. 4 and 5, with FIG. 4 illustrating the gas bag 10 in the state installed in the backrest 21 in direction of this backrest 21, whereas the non-inflated gas bag 10 according to FIG. 5 lies on a flat base U, so that the first seam 13 and the other first seams 13.1 and 13.2 lie in the plane of the base U, with the second seam 14, however, extending substantially perpendicular on the base U and thus also perpendicular to the plane defined by the first seam 13 and the further first seams 13.1 and 13.2.

The provision of such a second seam 14, extending transversely to the first seam 13, it is apparent from FIG. 2 that the second seam 14 forms in this region a chamber 12 of this gas bag 10 with a substantially greater gas bag thickness in vehicle transverse direction (y-direction) as is the case at the opposite end of the gas bag 10 with the further seams 13.1 and 13.2 extending in the same plane as the first seam 13. Since the lower region of the gas bag 10, formed by the second seam 14, is located in the hip area of a vehicle occupant, a particularly high level of protection is achieved in the event of a side impact, because in particular a sufficient force coupling or sufficient support is realized on the sidewall of the passenger compartment of the vehicle.

Figure 15:
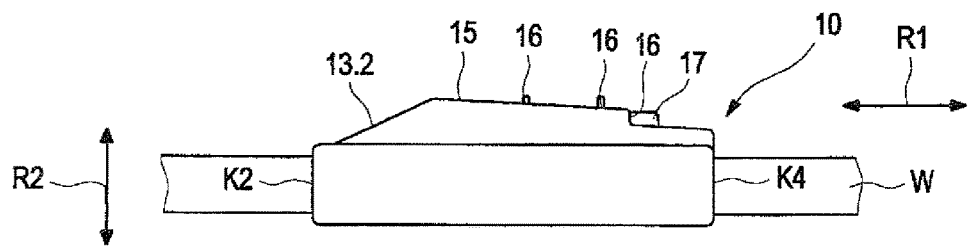

In the following, the folding of the gas bag 10 into a gas bag package, illustrated in FIG. 15 and installed in the backrest 21 of the vehicle seat 20 according to the FIGS. 1 and 2, will be explained.

Figure 6:
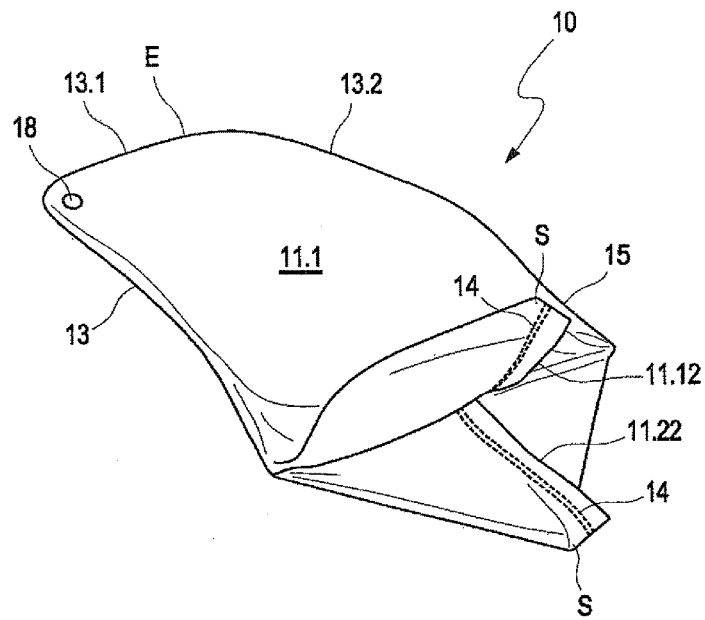
Figure 7:
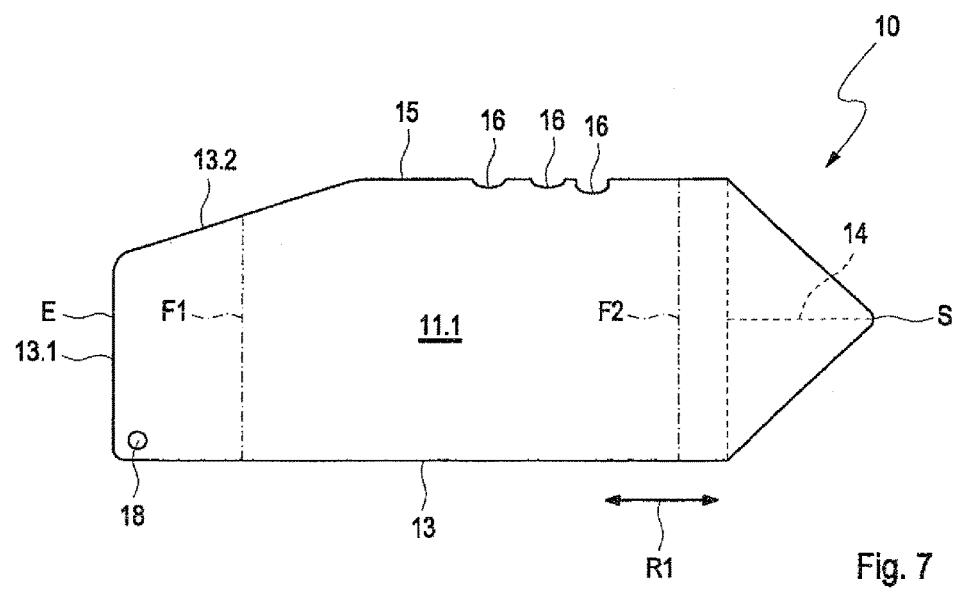

After the first seam 13 and the further first seams 13.1 and 13.2 have been produced and the second seam 14 has subsequently been everted and produced, the two material layers 1.1 and 11.2 are initially placed upon one another along the fold line 15 before commencing the folding of the gas bag 10, wherein the region of the second seam 14 with formation of a tip S is folded inwards in accordance with FIG. 6 and then the two tips S are placed flatly upon one another according to FIG. 7.

Figure 8:
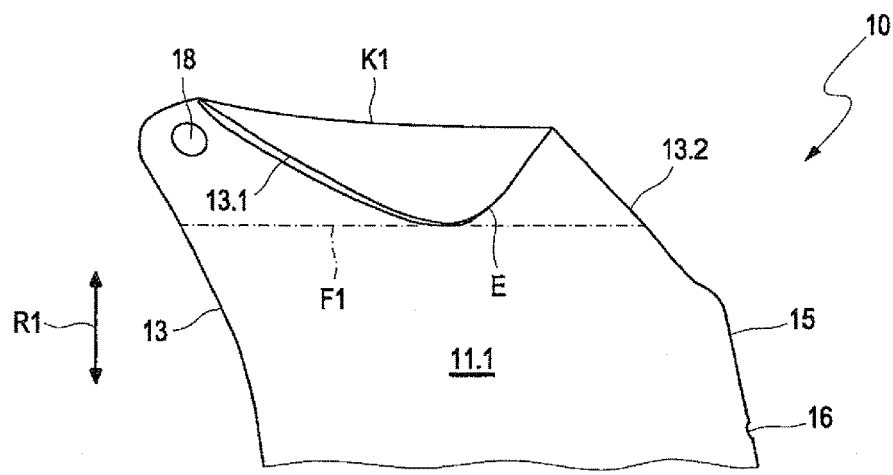
Figure 9:
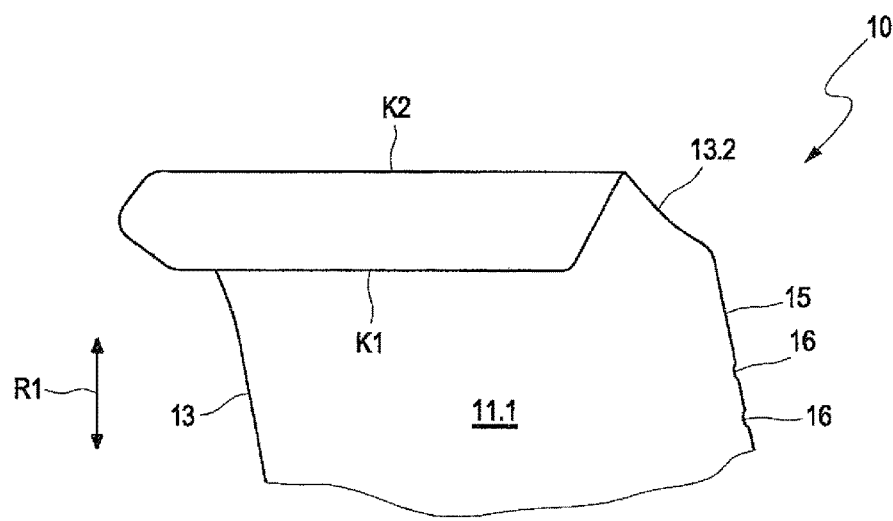

The folding begins at the end E of the flat gas bag 10 in opposition to the tip S, which end is closed by the further second fold 13.1. According to FIG. 8, this end E is folded over in a first direction R1 up to a fold line F1 to form a folded edge K1 and then folded a second time according to FIG. 9 to form a further folding edge K2.

Figure 10:
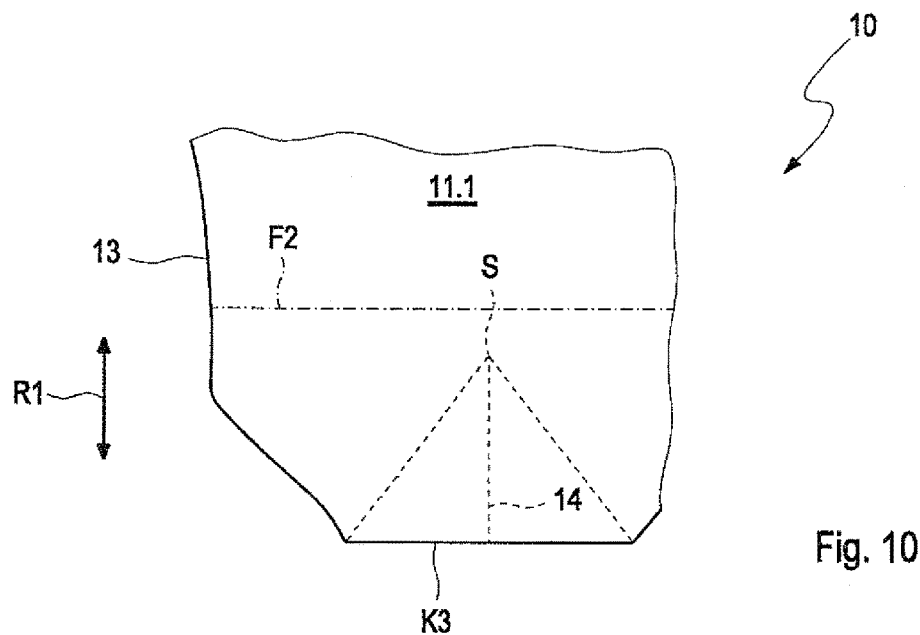
Figure 11:
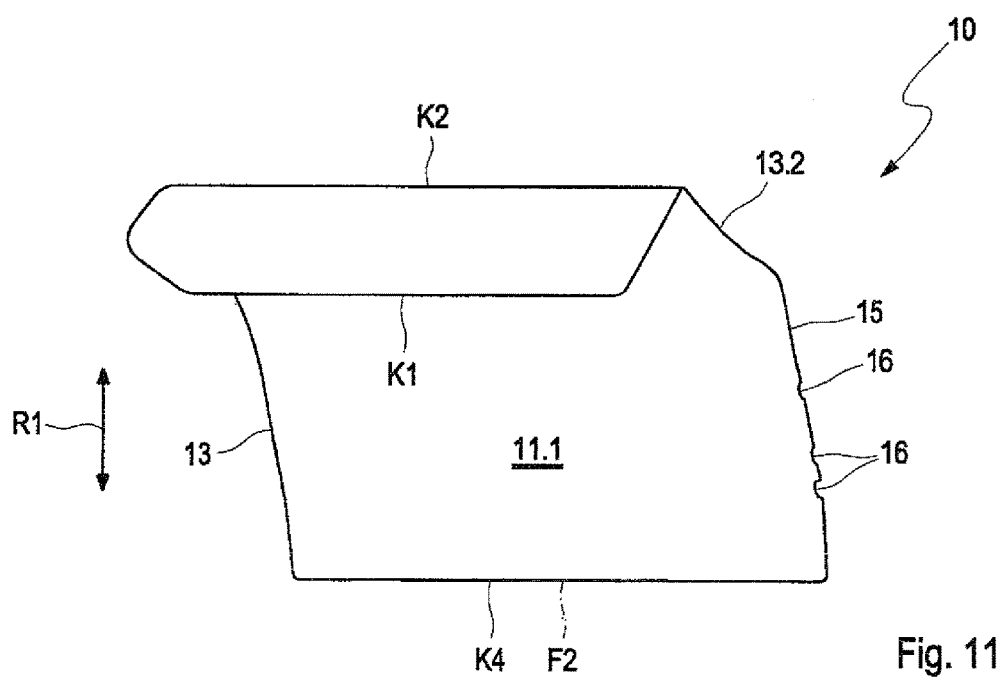
Figure 12:
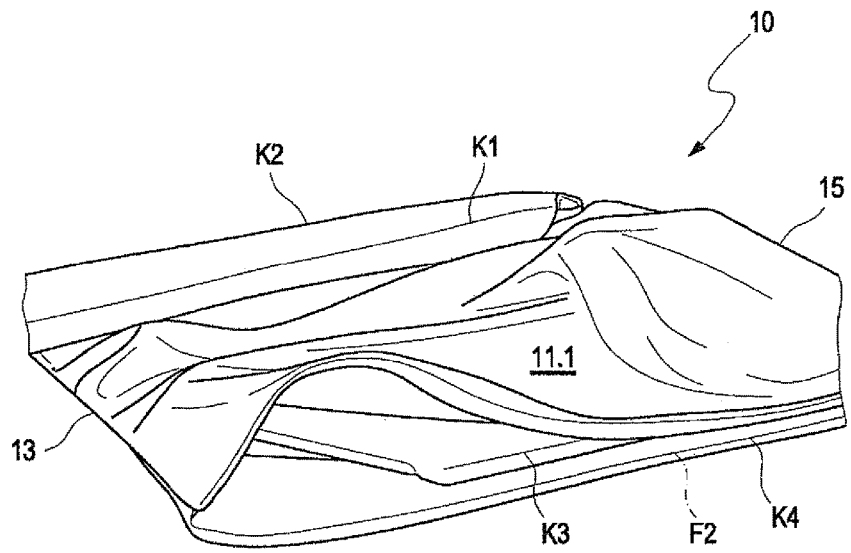

Subsequently, the tip S is folded downwards in accordance with FIG. 10 to form a fold edge K3 and this region with the fold edge K3 is then slipped into the interior of the gas bag 10 up to a fold line F2, while forming a fold edge K4 such that the fold edge K3 aligns with the fold edge K4, as can be seen from FIGS. 11 and 12.

Figure 13:
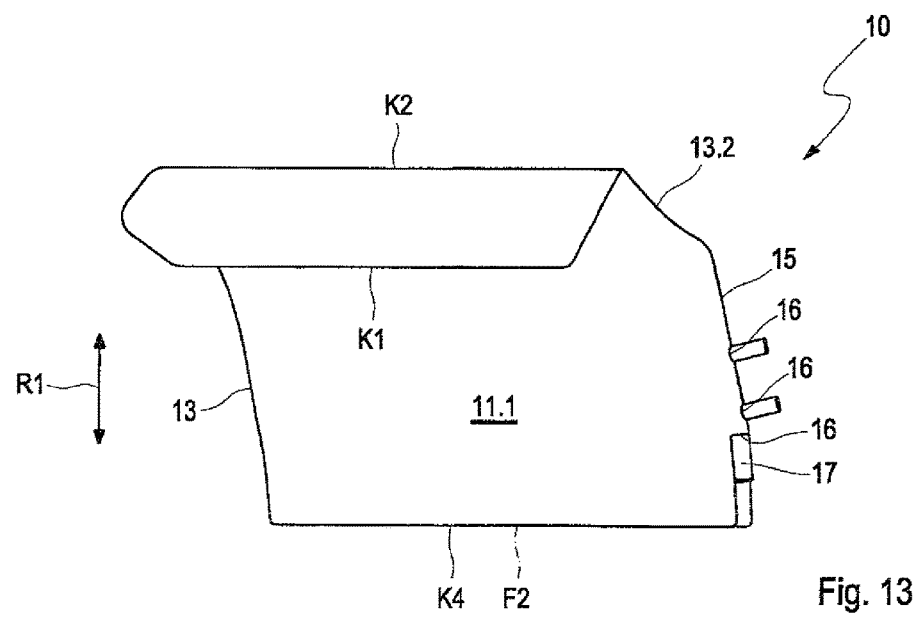
Figure 14:
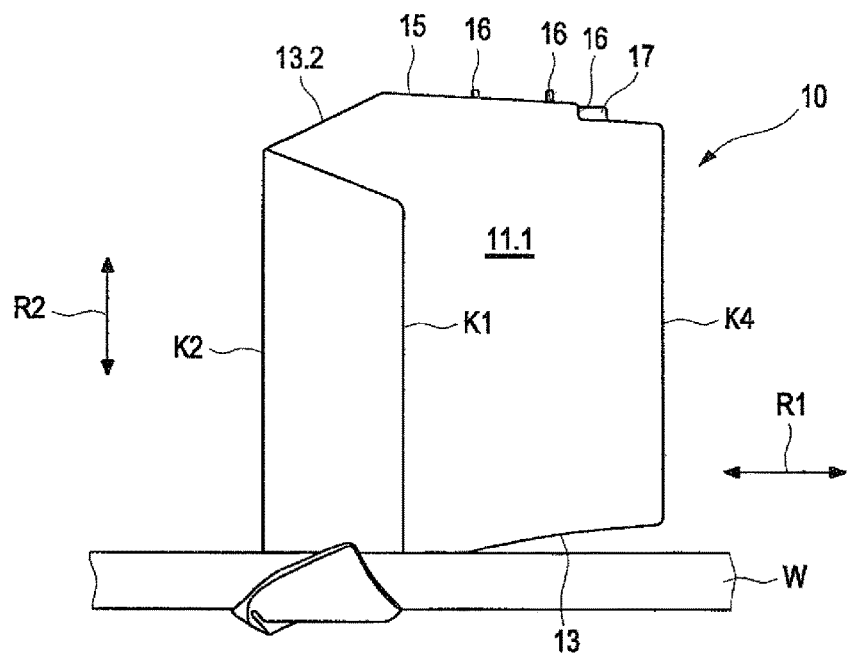

In this state of the folded gas bag 10, a gas generator 17 is inserted in the area of the fold edge 15 (cf. FIG. 13). Thereafter, this folded gas bag 10 is rolled up according to FIG. 14 in a direction R2 perpendicular to the first direction R1 by means of a flat bar W starting from the end, which is opposite to the fold line 15, up to the gas generator 17. FIG. 15 shows this state of the gas bag 10 as a gas bag package, which is installed in the backrest 21 of the vehicle seat 20 according to FIGS. 1 and 2.

The invention claimed is:

1. A method for folding a side airbag, comprising:
   connecting a first material layer and a second material layer along a first edge portion by a first seam such as to bound at least in part a chamber;
   connecting the first and second material layers along second edge portions by a closed second seam in perpendicular relation to the first seam to bound the chamber in addition to the first seam;
   placing the two material layers flat upon one another;
   slipping a region of the second seam in a first direction inwards while forming a tip;
   folding an end of the first and second material layers in opposition to the tip several times in the first direction;
   folding over the tip thereby creating a folded-over portion, and slipping the folded-over portion in the first direction inwardly;
   inserting a gas generator in the first direction into the two material layers; and
   roll folding from an end in opposition to the gas generator in a second direction in transverse relation to the first direction,
   wherein after the side airbag has been installed in a vehicle and fully inflated, the second seam extends in a transverse direction of the vehicle.

* * * * *